United States Patent Office 3,439,702
Patented Apr. 22, 1969

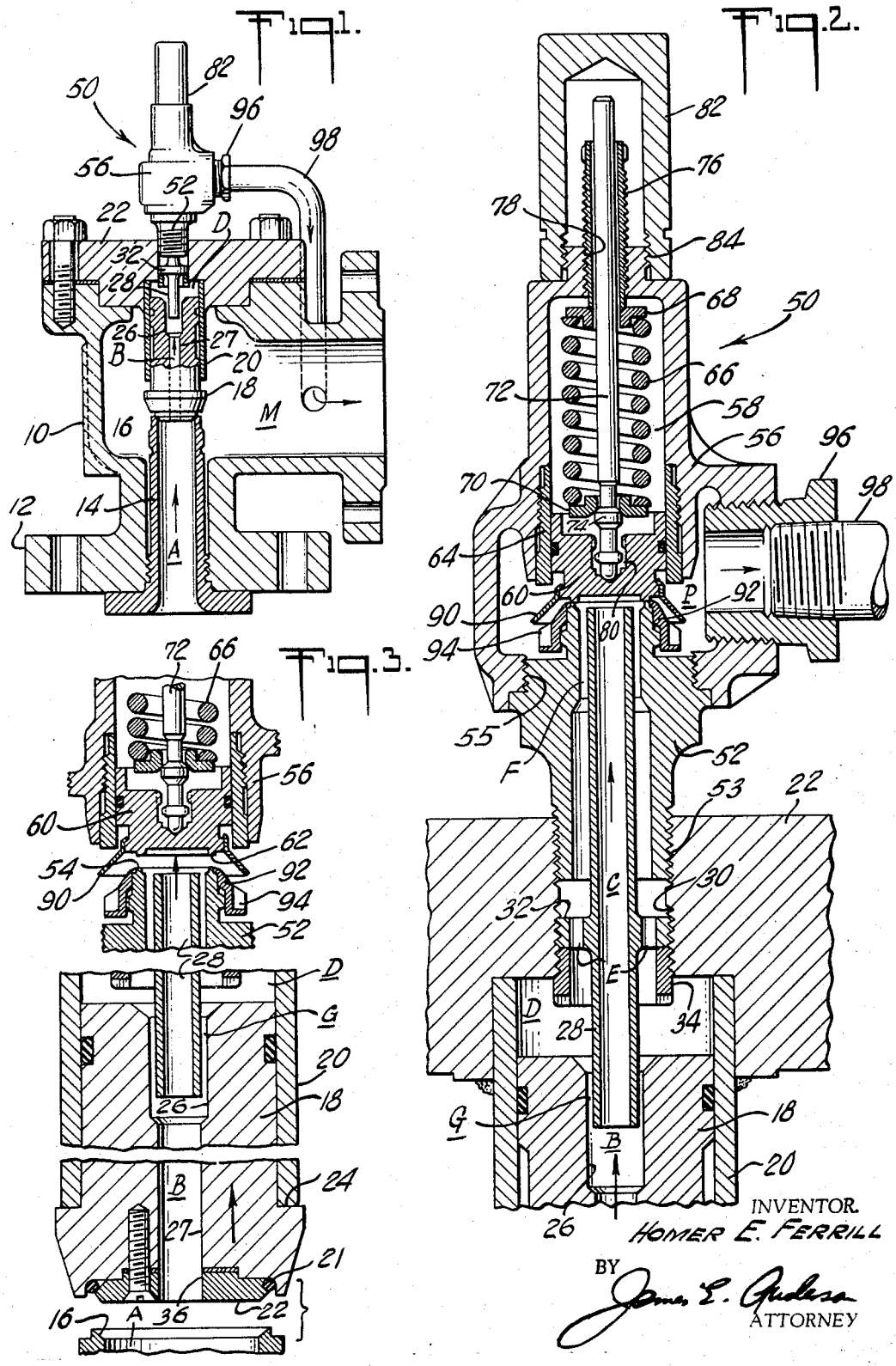

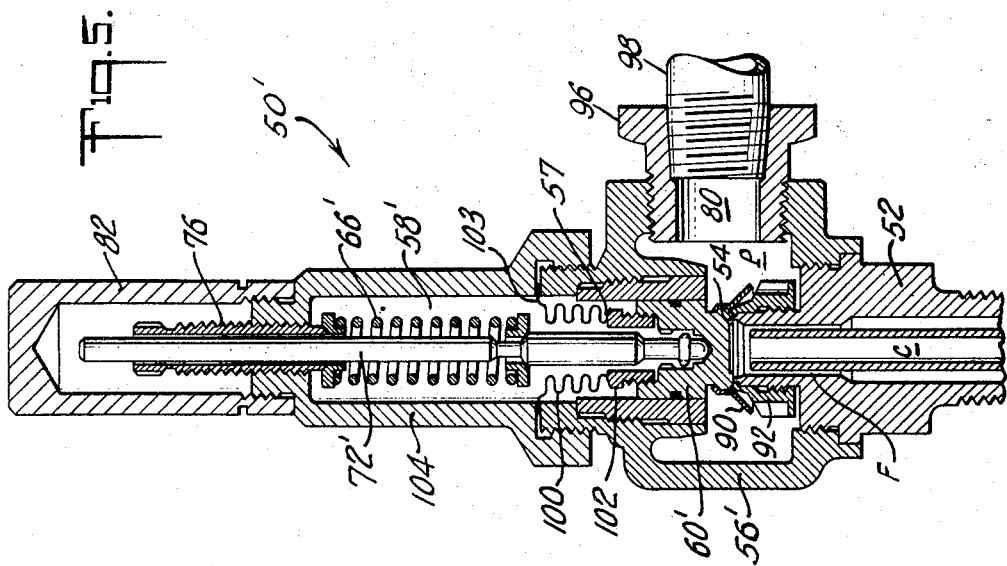
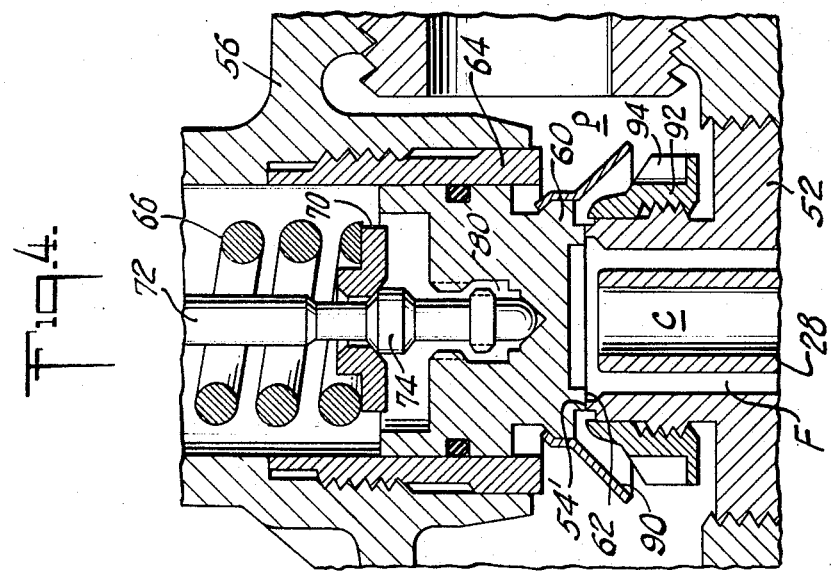

3,439,702
PILOT OPERATED SAFETY RELIEF VALVE
Homer E. Ferrill, Alexandria, La., assignor to Dresser Industries, Inc., Dallas, Tex., a corporation of Delaware
Filed June 13, 1966, Ser. No. 557,080
Int. Cl. F16k 17/32, 31/12
U.S. Cl. 137—478                    11 Claims

ABSTRACT OF THE DISCLOSURE

A pilot operated pressure relief valve for the relief of system overpressure. The pilot mechanism is integrally assembled to the main valve adapted for mounting in fluid communication with a system in which overpressure is to be relieved. System pressure is internally transmitted via parallel passages to the pilot mechanism which is responsive thereto for operating the main valve to effect relief.

---

This invention relates to safety relief valves of the type operated by a pilot mechanism.

It has been proposed to operate safety relief valves under the control of a pilot mechanism. However, these prior valves have not been entirely satisfactory and have found acceptance in only limited applications. One difficulty with these prior valves is that they involve an external pressure sensing connection (i.e. the connection between the inlet of the main valve and the pilot), which connection is subject to freezing, damage, and other problems. Another difficulty with the prior valves is that the flow passage to the pilot valve is subject to clogging when used with fluids containing deposits of foreign matter or corrosion products. This clogging affects the safe operation of these valves which, heretofore, have not been provided with a "fail-safe" construction found to be entirely satisfactory to users.

The general object of this invention is to provide a pilot operated safety relief valve which overcomes the above-discussed deficiencies of the prior valves of this type. Briefly stated, this object is achieved by a valve design in which the pressure sensing connection is located entirely internally of the valve structure thereby minimizing exposure to the external temperature conditions and avoiding exposure to mechanical damage or breakage. Also, the valve design in accordance with the invention involves flow passages leading to the pilot mechanism which provide relatively large flow areas, avoiding the use of needle valves or similar easily clogged devices. Also, provision is made for alternate or bypass passages whereby if one passage becomes clogged, the flow to the pilot may take an alternate clear path. Furthermore, the valve design in accordance with the invention achieves a truly fail-safe operation even when all connections to the pilot mechanism are blocked. This latter feature of the invention is achieved by the provision of an arrangement whereby the pilot valve will open in response to the increase of the system pressure a relatively small amount over the set pressure.

Another feature of the pilot operated safety relief valve in accordance with the invention is that the blowdown can be achieved at the pilot valve whereat the flow is substantially less than the flow past the main valve, whereby a much shorter blowdown is possible. Moreover, the construction in accordance with the invention is such that the blowdown is adjustable by a conventional adjusting ring.

Another feature of the pilot operated valve in accordance with the invention is that as compared with a spring operated safety relief valve, a substantial savings in space and cost can be achieved in the larger size valves by replacing the relatively large spring and bonnet with the pilot construction.

A still further feature of the invention is the provision of a pilot operated safety relief valve which will operate with the pilot valve discharge conduit being connected to the main valve discharge even where a superimposed variable back pressure is encountered during use. Briefly stated, this desirable result is achieved by the provision of a compensating means in the pilot valve mechanism so as to obviate the affect of the back pressure on the pilot valve. Prior valves of the indicated type are not constructed for use under conditions of operation involving a variable back pressure and such valves provide for discharge from the pilot directly to atmosphere, or, in the case of toxic fluids, to a collecting chamber. By the arrangement in accordance with the invention the pilot valve may discharge directly to the main valve discharge thereby avoiding the loss of fluid or the need for a collecting chamber.

Another feature of the valve in accordance with the invention is that the pilot is operable with vapors, gases and liquids.

The above and other objects and features of the invention will become apparent from a consideration of the following description with reference to the accompanying drawings, wherein:

FIGURE 1 is a sectional view of a pilot operated safety relief valve in accordance with the invention, with various parts being broken away for purposes of illustration;

FIGURE 2 is an enlarged sectional view of the pilot valve structure of the valve shown in FIGURE 1;

FIGURE 3 is an enlarged fragmentary view of a detail illustrating the cooperation of the main and pilot valves of FIGURE 1;

FIGURE 4 is an enlarged fragmentary view of the pilot valve shown in FIGURE 2; and FIGURE 5 is a sectional view of a modified form of pilot valve mechanism for use in the relief valve in accordance with the invention.

Referring to the drawings, the pilot operated safety relief valve in accordance with the invention comprises a main body or casing 10 which has the usual base flange 12 for use in mounting the valve to the pressure container with which the relief valve cooperates in use. A nozzle 14 is mounted in threaded engagement within a bore in the valve body 10 and provides an annular valve seat 16 at its upper end and a vertically extending inlet passage A. In use, the inlet passage A will communicate at its downstream end with the pressure container with the annular valve seat 16 surrounding the inlet passage discharge end. A valve head or disc 18 is mounted for movement within a hollow, cylindrical guide 20 secured to a cover plate 22, as by welding. The cover plate 22 is secured by means of bolts to the upper part of the body 10. In the assembled condition, the guide 20 and the valve disc 18 are in coaxial relation with the valve seat 16.

The valve disc 18 carries, at its lower end, an O-ring seat seal 21 secured in position in coaxial relation with the seat 16 by a retainer disc 22 mounted on the disc 18 by screws. The O-ring seat seal 21 and the valve disc 18 cooperate with the annular valve seat 16 to provide a leaktight contact for closing the discharge end of the inlet passage A to block flow therefrom to the main valve chamber M formed within the valve body 10. It will be apparent that by this arrangement the valve disc 18 is mounted, much like a piston within a cylinder, for movement toward and away from the valve seat 16 to effect opening and closing of the main valve to either permit or block flow from inlet chamber A to the main valve outlet chamber M.

The movement of the valve disc 18 downwardly toward the valve seat 16 is limited, of course, by contact of the seal 21 and retainer 22 with this valve seat 16. The movement of the valve disc 18 away from the valve seat 16 to the open position is limited by cooperation of an annular shoulder 24 formed on the valve disc 18 with the lower end of the guide 20 as is best shown in FIGURE 3.

The valve disc 18 has a pair of central, axial upper and lower bores 26 and 27, respectively, formed therein and defining a vertical passage B therethrough. The upper bore 26 is enlarged so as to receive, with a restricted clearance indicated at G, the lower end of a pressure sensing tube 28, which is mounted on the cover plate 22 by engagement of a flange 32 on the tube 28 with a threaded bore 30 in the cover plate. The tube 28 is secured in position by a lock nut 34 which also is in threaded engagement with bore 30 and is positioned to contact the flange 32.

The parts are constructed to provide a chamber D above the valve disc 18. At its lower end, the passage B communicates through a central opening 36 in retainer 22 with the central portion of the discharge end of the inlet chamber A. It will be noted that the pressure at the central portion of the discharge end of the inlet passage A is the same as the static pressure of the vessel being protected. Moreover, the pressure at the lower end of the passage B will be the same. While this is obviously the case when the valve disc is in its closed position, it will be noted that this equal pressure condition also exists with the valve disc 18 in its open position because of the arrangement whereby the lower end of the passage B will receive any flow passing up through the central portion of the nozzle. Since the pressure in the inlet passage A corresponds to the pressure in the pressure container with which the valve cooperates, the pressure in the lower end of the passage B will also be equal to the container pressure, and thus serve as an effective system pressure sensing location. Thus, with the main valve closed, pressure condition in the inlet passage A will be communicated to the upper chamber D by way of passage B and the annular restricted clearance passage G between the outer wall of tube 28 and the wall of the bore 26 surrounding the same.

The parts are constructed so that the area on the upper face of the valve disc 18 subjected to the pressure within chamber D is from 10 to 15 percent greater than the area on the bottom side of the disc 18 subjected to the pressure in the main valve inlet (that is, the disc area enclosed by the valve seat 16). Accordingly, so long as the pressure in chamber D above the valve disc 18 is the same as the pressure within the main valve inlet A, the valve disc 18 will remain in its closed position. In other words, the construction is such that there is provided a positive loading on the valve disc 18 holding it against the seat 16 and thereby closing the main valve.

The pilot mechanism is indicated generally at 50 and comprises a pilot base 52 which has an externally threaded tubular portion 53 in engagement with the threaded bore 30 in the cover plate 22 for mounting the pilot mechanism thereon as is shown in FIGURE 2. The base 52 has a passage extending vertically therethrough and communicating at its lower end with bore 30, this passage providing the pilot valve inlet. The base 52 provides an annular valve seat 54 surrounding the discharge end of the pilot inlet passage.

The pilot mechanism 50 is provided with a bonnet 56 threadedly secured to the base 52 at an internally threaded bore 55 and constructed to define a pilot valve outlet chamber P and a spring-housing chamber 58. A pilot valve disc 60 is provided with a finished annular portion 62 at its underside arranged to contact the seat 54 in a leaktight manner for closing the discharge end of the pilot inlet passage to block flow therefrom to the pilot valve outlet chamber P. The pilot valve disc 60 is mounted for movement within a hollow, cylindrical guide 64 threadedly secured in position in an internal wall of the bonnet 56. In the assembled condition the guide 64, the valve disc 60 and the annular portion 62 are in coaxial relation with the valve seat 54.

A loading spring 66 is mounted within the chamber 58 in compression between upper and lower spring washers 68 and 70, respectively. A valve loading spindle 72 mounts the spring washers 68 and 70 as shown in FIGURE 2 with the lower spring washer 70 being biased downwardly against an enlarged abutment portion 74 on the spindle 72 and the upper portion of the spindle passing through a vertically adjustable gland 76 in threaded engagement with the wall of a central bore 78 in the top closure portion of the bonnet 56. The upper washer 68 is biased against the lower end of the adjustable gland 76 by the loading spring 66. The lower end of the spindle 72 is swively engaged within a cavity 80 formed in the valve disc 60 with the bottom end of the spindle 72 bearing against the valve disc 60 under the bias of spring 66.

It will be apparent that by adjustment of the gland 76 to various vertical positions on the bonnet 56, the load applied by the spring 66 to the valve disc 60 may be varied.

A hollow cylindrical cap 82 is mounted on the upper end of the bonnet 56 and is threadedly secured thereto at 84. The cap 82 serves as an auxiliary bonnet and encloses the gland 76 to prevent leakage from the chamber 58 to the exterior of the valve.

An annular skirt 90 is secured on the pilot valve disc 60. The undersurfaces of the skirt 90 and the disc 60 are contoured to provide the roof of the usual huddling chamber. The undersurface of the skirt 90 also acts to deflect the fluid escaping over the valve seat 54 downwardly towards the discharge opening to create a kinetic force which assists in lifting the valve disc 60 from the seat 54.

The pilot valve 50 is also provided with a conventional blowdown ring 92 in threaded engagement with the exterior of the tubular seat forming portion of the base 52. This ring 92 is provided with the usual equally circumferentially spaced vertical ribs 94 defining slots into which a lock pin (not shown) may be projected to hold the blowdown ring in the adjusted position. The manner in which the position of the blowdown ring 92 relative to the roof of the huddling chamber controls the blowdown is entirely conventional. Briefly, when the blowdown ring 92 is moved upwardly, this increases the blowdown (i.e. lowers the reseating pressure), and when the ring is moved downwardly, this decreases the blowdown (i.e. raises the reseating pressure).

An outlet fitting 96 is secured to the bonnet 56 and a line 98 is connected therefrom to the outlet chamber M of the main valve. Accordingly, communication is provided from the pilot valve outlet chamber P through the outlet fitting 96 and the line 98 to the outlet chamber M of the main valve.

Referring now particularly to FIGURE 2, the upper end of the pressure sensing tube 28 terminates in the region of the pilot valve seat 54 and is spaced from the underside of the valve disc 60. Thus, pressure communication is provided between the central passage B in main disc 18 and the discharge end of the pilot inlet by way of the internal passage C of the pressure sensing tube 28. Pressure communication is also provided from the passage B through the restricted clearance G to the chamber D on the upper side of the main valve disc and from this chamber D upwardly through a plurality of holes E in the sensing tube flange 32, the bore 30 and the annular space F between the central bore in base 52 and the exterior of the pressure sensing tube 28 to the discharge end of the pilot inlet. Accordingly, with the pilot valve in the closed position shown in FIGURE 2, the pressure will equalize in chamber D, the passage C and the upper or discharge end of the pilot inlet to the pressure in the passage B.

In operation, so long as the pressure in the vessel or system being protected by the safety relief valve is below the set pressure, the main and pilot valves will be in the closed position as shown in FIGURES 1 and 2. Under these conditions, the pressure in the main valve inlet chamber A, which is the same as the vessel or system pressure, will also be present in chamber D by reason of the interconnection of these chambers by way of passage B and clearance G. Accordingly, since the pressure responsive area on the upper face of the main disc 18 is greater than the pressure responsive area on the underside as discussed above, the main disc 18 will remain in the closed position. Moreover, this same pressure will be equalized in the internal passage C of the pressure sensing tube 28, the annular chamber F between the pressure sensing tube and the bore in the base 52, and at the discharge end of the pilot inlet whereby this pressure acts on the underside of the pilot valve disc 60 against the bias of spring 66 to tend to lift the disc 60 off its seat.

When the pressure in the vessel or system rises, this higher pressure is communicated by the various passages described above to the discharge end of the pilot valve inlet and acts on the lower face of the pilot valve disc 60. When this pressure reaches the set pressure of the pilot valve, the pilot disc 60 rises from the seat 54 to provide communication between the pilot inlet and the pilot outlet P by way of the annular passage between the valve seat 54 and the valve disc 60. When the pilot valve opens, the volume of fluid in the chamber D serves to assist the action of the fluid flow through chamber C the sensing tube 28 in the lifting of the pilot valve to the full lift position. It is apparent that the pressure acting on the valve disc 60 during this condition of the pilot valve is sufficient to overcome the bias of the load spring 66. The flow through the pilot valve passes from the outlet chamber P through the outlet connection 96 and the line 98 to the outlet chamber M of the main valve. The pilot valve will remain open so long as the pressure in the underside of the valve disc 60 is greater than the spring load, this pressure resulting from the combined effect of fluid passing from chamber B up through the pressure sensing tube 28 to the pilot disc 18 and the fluid flowing from the chamber D along the exterior of the pressure sensing tube 28 to the underside of the valve disc 60. It will be noted that after evacuation of the chamber D, whereby the flow from the chamber D is considerably reduced since it must receive fluid from the narrow clearance G but can discharge through the larger passage F, the flow through the pilot valve is relatively small. This relatively small flow permits a low blowdown setting as compared with the blowdown setting which could be achieved by using a blowdown ring at the main valve where the volume of flow is substantially higher.

When the pilot valve is actuated to the open position, the fluid in chamber D will be exhausted rapidly and pass upwardly through holes E and annular chamber F and through the pilot valve to chamber P. There will be a rapid reduction in pressure in chamber D as a result of an aspirating action caused by the fluid passing from the pilot inlet past the pilot valve seat to the pilot outlet. This aspirating action is in addition to the flow from chamber D caused by the pressure difference which results between chambers D and P when the pilot valve is opened.

The opening of the pilot valve effectively reduces the pressure in chamber D to approximately 50 percent of system pressure. Since the main valve disc will move upwardly when the pressure in chamber D is approximately 85 percent of system pressure because of the difference in pressure areas on the upper and lower sides of the main disc as discussed above, the main valve is moved to the open position shortly after the pilot valve opens. The main and pilot valves will remain open so long as the system pressure is above the set pressure. However, if the system pressure reduces to the blowdown or reseating pressure of the pilot valve, the pilot valve will close and the system pressure will again be equalized in the chamber D whereby the main valve will return to its closed position.

It will be noted that the valve in accordance with the invention is truly "fail-safe." In the first place, the bore C in the sensing tube and the annular space F provide relatively large areas which could not become clogged easily. Moreover, while the clearance G between the sensing tube 28 and the bore 26 in the main disc 18 is comparatively small, plugging of this clearance G will not affect the safe operation of the valve as will appear more fully hereafter.

Considering the fail-safe operation of the valve it will be noted that in the event the passage C in the sensing tube 28 should become plugged, the system pressure is still communicated to the pilot valve inlet by way of a path comprising the clearance G, chamber D, the holes E and the annular passage F. In this case, as the pressure rises above the set pressure of the pilot valve, the pilot valve will open reducing the pressure in the chamber D so as to cause the main valve to open. If conditions are such that there is insufficient flow through the opening C in the sensing tube to maintain the pilot valve in the lift position, the pilot valve will close thereby causing the main valve to close. The pressure will then again build up under the pilot disc 60 and cause the pilot valve to open whereby the main valve will also open. Under these conditions the main valve, as well as the pilot valve, will cycle providing a measure of protection to the vessel. Moreover, this repeated cycling of the main valve would have a tendency to dislodge any foreign material within the passage C of the sensing tube 28 clogging the same.

If the clearance G between the sensing tube 28 and the main disc 18 should become clogged sufficiently to reduce flow therethrough but not enough to form a mechanical bond, the system pressure is still communicated to the pilot valve disc through the passage C in the sensing tube 28. Under these conditions, if the pilot valve opens, the chamber D is evacuated by flow through holes E and passage F and the main valve disc 18 will open. When the pilot valve closes subsequently, the pressure again builds up in the chamber D by passing from passage B through passage C and over the top of the sensing tube 28, and downwardly through the passage F and holes E to the chamber D thereby equalizing the pressure on the main disc 18 and causing closing of the same.

If both the clearance G and the opening C should become clogged, the main valve disc 18 will be lifted from the seat 16 by a pressure of from 110 percent to 115 percent of set pressure. As the valve disc moves upwardly it tends to compress the fluid in chamber D and since this action is transmitted upwardly to the pilot valve disc 60, the pilot valve will open allowing the main valve disc 18 to open fully. It will be noted that the fluid in chamber D is not actually compressed to any great extent but there is merly a compression of this fluid in an amount sufficient to open the pilot valve against the load spring force. After this initial compression, the chamber D is evacuated in the manner discussed above and the main valve opens.

It will be noted that the pilot operated safety relief valve in accordance with the invention achieves the objectives of the invention by providing truly fail-safe operation, a completely internal pressure sensing tube, an effective blowdown adjustment at the pilot valve rather than at the main valve thereby permitting a shorter blowdown, and a substantially clog-free construction.

When the valve in accordance with the invention is to be used under conditions where a superimposed back pressure is present, the modified form of pilot mechanism indicated generally at 50', and shown in FIGURE 5, should be used. The pilot mechanism 50' is essentially the same as the pilot mechanism 50 shown in FIGURES 1 to 4 wherefore the identical parts have been given the same reference numerals and corresponding parts have been given like reference numerals with primes added. The only essential difference is the provision of a metallic bellows 100 which is secured at its lower end to a ring 102 threadedly mounted on the upper end of the pilot disc 60'. The bellows 100 is secured to the ring, for example, by braizing, welding or soldering, so as to form a leaktight connection. The upper end of the bellows 100 is turned outwardly to form a substantially horizontal flange 103 the marginal portion of which is clamped between a bonnet casing 104 and a pilot valve casing 56'.

The bellows 100 is arranged to prevent pressure within the chamber 57 from getting into the spring housing chamber 58' to produce a pressure on the upper side of the valve disc 60' which would prevent the valve from opening at the set pressure. The pressure area on the upper surface of the valve disc 60' which is enclosed by the bellows 100 is equal to the internal area of the valve seat 54, it being noted that equal areas of the upper and lower surfaces of the valve disc overhang the seat 54. Accordingly, this is no differential area on the disc 60' to be affected by pressure variations in the outlet chamber P so that, under static conditions, the pilot valve will begin to rise from its seat as soon as the seat pressure is exceeded. By this arrangement, the variations in the superimposed back pressure encountered by the pilot valve are compensated for by the bellows arrangement and have no adverse affect on the operation of the pilot valve. Accordingly, the discharge of the pilot valve may be connected directly to the discharge of the main valve and need not be connected to atmosphere.

It will be noted that in the modification shown in FIGURE 5, the spindle 72' and the load spring 66' take a slightly different form from the corresponding parts shown in FIGURE 2 in order to accommodate the bellows 100 described above. In all other respects the pilot mechanism shown in FIGURE 5 is identical to that shown in FIGURES 1–4.

What is claimed is:

1. A pressure relief valve comprising a main valve portion including an inlet adapted to be placed in communication with the pressure source to be relieved, an outlet, a valve seat surrounding the downstream end of the inlet and arranged to deliver fluid to said outlet, and a main valve member mounted for movement toward and away from said valve seat for controlling flow from said inlet to said outlet, a pilot mechanism for controlling operation of said main valve including an inlet, an outlet, a valve seat surrounding the downstream end of said pilot inlet and arranged to deliver fluid to said pilot outlet, a pilot valve member mounted for movement toward and away from said pilot valve seat for controlling flow from said pilot inlet to said pilot outlet, means biasing said pilot valve member towards said pilot valve seat, said pilot valve member being responsive to the fluid pressure condition in said pilot inlet so as to be urged toward lifting from said pilot valve seat thereby, means sensing the pressure in said main valve inlet and transmitting said pressure to said pilot inlet, means connecting said pilot valve outlet to said main valve outlet and means on said pilot mechanism cooperable with said pilot valve member to prevent variations in said main valve outlet from affecting the operation of said pilot valve, means defining a control chamber, and means responsive to the fluid pressure in said control chamber for urging said main valve member towards said main valve seat in opposition to the lift force on the main valve member, passage means providing communication between said control chamber and said pilot inlet, said means responsive to the pressure in said control chamber being constructed to provide a force sufficient to close said main valve member when said pilot valve is closed and the pressure in said control chamber is equalized with the pressure in said main valve inlet, and so that when the pilot valve opens to reduce the pressure in said control chamber by way of said passage means, the lift force will overcome the opposing force provided by the fluid pressure within said chamber so that the main valve opens.

2. A valve according to claim 1 wherein said last-named means comprises a bellows the lower end of which is connected to said pilot valve member and the upper end of which is fixed in leak-tight condition to prevent flow from said pilot outlet past the bellows.

3. A pressure relief valve comprising a main valve portion including an inlet adapted to be placed in communication with the pressure source to be relieved, an outlet, a valve seat surrounding the downstream end of the inlet, and a main valve member mounted for movement toward and away from said valve seat for controlling flow from said inlet to said outlet, a pilot mechanism for controlling operation of said main valve including an inlet, and outlet, a valve seat surrounding the downstream end of said pilot inlet, a pilot valve member mounted for movement toward and away from said pilot valve seat for controlling flow from said pilot inlet to said pilot outlet, and means biasing said pilot valve member towards said pilot valve seat, said pilot valve member being responsive to the fluid pressure condition in said pilot inlet so as to be lifted from said pilot valve seat thereby, means internally of the relief valve structure for sensing the pressure in said main valve inlet and transmitting said pressure to said pilot inlet, said last recited means comprising a passage in said main valve member communicating at one end with the discharge end of said main valve inlet, and a pressure sensing tube communicating at one end with said last-named passage in said main valve member and at the other end with said pilot valve member whereby the fluid pressure condition in the discharge end of said main inlet is transmitted to the pilot valve inlet by way of said passage and said pressure sensing tube and an annular passage externally of said pressure sensing tube in communication between said passage in the main valve member and said pilot inlet for providing an alternate passage for the transmission of fluid pressure from said main valve inlet to said pilot valve inlet and means responsive to the opening of said pilot valve member for opening said main valve member.

4. A pressure relief valve comprising a main valve portion including an inlet adapted to be placed in communication with the pressure source to be relieved, an outlet, a valve seat surrounding the downstream end of the inlet and arranged to deliver fluid to said outlet, and a main valve member mounted for movement toward and away from said valve seat for controlling flow from said inlet to said outlet, a pilot mechanism for controlling operation of said main valve including an inlet, an outlet, a valve seat surrounding the downstream end of said pilot inlet and arranged to deliver fluid to said pilot outlet, a pilot valve member mounted for movement toward and away from said pilot valve seat for controlling flow from said pilot inlet to said pilot outlet, and means biasing said pilot valve member towards said pilot valve seat, said pilot valve member being responsive to the fluid pressure condition in said pilot inlet so as to be urged toward lifting from said pilot valve seat thereby, means sensing the pressure in said main valve inlet and transmitting said pressure to said pilot inlet, said last recited means comprising a passage in said main valve member communicating at one end with the discharge end of said main valve inlet, a pressure sensing tube communicating at one end with said last-named passage in said main valve member and at the other end with said pilot valve member whereby the fluid pressure condition in the discharge end of said main inlet is transmitted to the pilot valve inlet by way of said passage and said pressure sensing tube and an annular passage externally of said pressure sensing tube in communication between said passage in the main valve member and said pilot inlet for providing an alternate passage for the transmission of fluid pressure from said main valve inlet to said pilot valve inlet, means defining a control chamber, and means responsive to the fluid pressure in said control chamber for urging said main valve member towards said main valve seat in opposition to the lift force on the main valve member, passage means providing communication between said control chamber and said pilot inlet, said means responsive to the pressure in said control chamber being constructed to provide a force sufficient to close said main valve member when said pilot valve is closed and the pressure in said control chamber is equalized with the pressure in said main valve inlet, and so that when the pilot valve opens to reduce the pressure in said control chamber by way of said passage means, the lift force will overcome the opposing force provided by the fluid pressure within said chamber so that the main valve opens.

5. A pressure-relief valve for relief of system overpressure comprising a main valve adapted for mounting in fluid communication with a system having overpressure to be relieved, said main valve defining a fluid passage between an inlet to receive fluid pressure from the system and an outlet for discharging fluid received from said inlet, a seat surrounding said inlet at an intermediate location in said passage and a closure disk cooperating with said seat for opening and closing said passage to fluid flow, and a pilot valve mechanism secured to said main valve and including operatively responsive means responsive to pressure in the system on which said main valve is mounted to control the relation of said main valve closure disk to its seat, and a defined flow passage communicating inlet fluid pressure from at said main valve seat to said operatively responsive means of the pilot valve mechanism, including means providing parallel fluid flow at least partially therebetween.

6. A pressure relief valve according to claim 5 in which the operatively responsive means of said pilot valve mechanism includes a fluid passage between an inlet and an outlet, a seat surrounding said inlet at an intermediate location in said passage, and a pilot valve member cooperating with and biased toward said seat in opposition to pressure at said inlet for opening and closing the fluid passage thereof.

7. A pressure relief valve according to claim 6 in which said flow passage is further defined by a sensing tube and an opening extending axially parallel to said tube radially outward thereof to provide said parallel flow.

8. A pressure relief valve according to claim 7 in which said defined opening annularly surrounds said sensing tube along at least a partial extended length thereof.

9. A valve according to claim 6 wherein said pilot valve mechanism comprises a blowdown ring cooperable with said pilot valve member for adjusting the reseating pressure of said pilot valve.

10. A valve according to claim 5 comprising means connecting said pilot valve outlet to said main valve outlet.

11. A valve according to claim 10 wherein said pilot mechanism comprises means cooperable with said pilot valve member to prevent variations in the pressure in said main valve outlet from affecting the operation of said pilot valve.

References Cited

UNITED STATES PATENTS

| | | | |
|---|---|---|---|
| 2,890,714 | 6/1959 | Greenwood et al. | 137—491 XR |
| 3,077,898 | 2/1963 | Raymond | 137—491 |
| 3,164,166 | 1/1965 | Tennis | 137—491 |

M. CARY NELSON, *Primary Examiner.*

ROBERT J. MILLER, *Assistant Examiner.*

U.S. Cl. X.R.

137—491